(12) United States Patent
Fink (10) Patent No.: US 6,302,374 B1
(45) Date of Patent: Oct. 16, 2001

(54) EXTENDED STEM GLOBE VALVE (75) Inventor: Michael S. Fink, Macungie, PA (US)

(73) Assignee: Acme Cryogenics Inc., Allentown, PA (US)

( * ) Notice: Subject to any disclaimer, the term of this patent is extended or adjusted under 35 U.S.C. 154(b) by 0 days.

(21) Appl. No.: 09/489,208

(22) Filed: Jan. 21, 2000

Related U.S. Application Data (63) Continuation-in-part of application No. 09/042,405, filed on Mar. 13, 1998, now abandoned.

(51) Int. Cl.[7] .................................................... F16K 1/36
(52) U.S. Cl. ........................ 251/335.3; 251/368; 137/375
(58) Field of Search ......................... 137/375; 251/335.3, 251/368

(56) References Cited

U.S. PATENT DOCUMENTS

| | | | |
|---|---|---|---|
| 3,048,362 | * 8/1962 | Scarborough | ........................ 251/214 |
| 4,844,411 | * 7/1989 | Nelson | ................................. 251/214 |
| 5,456,285 | * 10/1995 | Lee | ................................... 251/264 X |
| 5,715,858 | * 2/1998 | Seneczko et al. | .......... 137/315.01 X |
| 5,934,327 | * 8/1999 | Nelson et al. | .................... 137/549 X |

* cited by examiner

Primary Examiner—Kevin Lee
(74) Attorney, Agent, or Firm—Ratner & Prestia (57) ABSTRACT

An extended stem globe valve for use with cryogenic fluids, wherein the elongated shaft between the valve seal or disk and the actuator is constructed so that rotational movement of the actuator results in linear movement of the shaft, without imparting a large rotational movement of the shaft about its longitudinal axis and with reduced thermal conduction between the mating parts. Coupling of the valve disk to a valve disk retainer is effected in the area above the valve seat. The valve also includes a shaft insulator so constructed and arranged to retain leakage fluid in a volume space closer to the valve seat. Optionally the valve can include bellows sealing of the shaft to prevent fluid from contacting the uppermost portion of the shaft.

18 Claims, 8 Drawing Sheets

EXTENDED STEM GLOBE VALVE

CROSS REFERENCE TO RELATED APPLICATION

This application is a Continuation-in-Part of U.S. application Ser. No. 09/042,405 filed Mar. 13, 1998, now abandoned.

STATEMENT REGARDING FEDERALLY SPONSORED RESEARCH OR DEVELOPMENT

Not applicable

BACKGROUND OF THE INVENTION

The present invention pertains to globe valves especially globe valves for use in cryogenic service.

Cryogenic fluids e.g. liquid hydrogen, liquid oxygen, liquid nitrogen, liquid helium, and liquid argon are delivered in large over the road tanker trucks to a customer location where the cryogenic liquid is off loaded from the truck into a large storage tank, as is well known in the art.

Both the tank truck and the storage receptacle or customer station, as they are known in the industry, include flow control valves which are used to both fill and dispense the cryogenic liquid.

Conventional valves are of the globe type having an extended stem to space the bonnet assembly of the valve from the valve seat, so that cryogenic liquid leaking along the shaft is warmed prior to coming in contact with the valve actuator so that the valve actuator does not freeze and render the valve inoperative.

Extended stem globe valves for use in cryogenic service can be either manually or pneumatically actuated to control flow into or out of the trailer or tank. The valves can also be vacuum jacketed to enhance insulation of the valve and thus further minimize the effect of cryogenic fluid leakage inside the valve.

Conventional extended shaft globe valves incorporate a plug body/fluorocarbon disk sandwich held together by a bolt/stud assembly. This type of assembly requires a nut and washer on the bottom of the plug assembly in order to hold the fluorocarbon plastic material (KEL-F) disk to the plug body. It is conventional for the nut to be staked in place, or a cotter pin is inserted through the bolt stud to prevent the assembly from coming apart during the service life of the valve. The problem with this type of assembly is that the nut and washer assembly is located below the fluorocarbon plastic material and is therefore exposed to the seat flow/pressure boundary of the valve. If the nut comes loose or falls off during the service life of the valve several problems can occur. One problem is that the nut/washer/fluorocarbon plastic material seat can all be lost and total control of the seating of the valve is lost. In addition, if this happens the compressed stream with which the valve is used will become contaminated and a potential source of a spark has been introduced into the system. Potential spark or ignition sources are a definite hazard where the valve is used with oxygen. If a cotter pin is used it is probable that only the nut will come loose but the assembly will stay attached. This type of design requires that the assembly have a through drilled orifice for attachment and, if the assembly becomes loose, there is potential for multiple leak paths through the assembly itself, even if the valve is in the "full-off position" where a greater amount of leakage can occur.

In addition, in conventional extended stem or shaft valve designs the ends of the shaft are generally flat and can be attached with a dovetail arrangement to both the plug body seat assembly on one end and the actuator on the other end, to permit disassembly of the valve. It is also possible to use rigid threaded connections on either end of the extended stem or shaft. The flat end design of conventional valves permits high heat leakage by conductance across the shaft. With flat ends rigidly connected to the valve plug assembly there is a potential for eccentric axial loading from the top of the stem to the plug assembly, which in turn can cause premature wear of the internal components of the valve.

It is also a common problem with current valve designs that when a valve is installed near a dynamic pressure application, i.e. such as the outlet side of a cryogenic liquid pump, that the valve "top works" in the area of the bonnet assembly and will begin to accumulate frost. The frost accumulation is a sign of minor failure or leakage in the "top works" of the valve. It is believed that a large volume of gas in the free space is the contributing factor to this type of premature failure. As the pressure surges inside of the piping and the associated valve, these surges are being introduced into the large gas pocket inside the valve and a combined pressure swing along with new colder gas being introduced by the percolating effect introduce excessive cold temperatures and wear on the valve packing.

Furthermore, it is conventional for extended stem cryogenic valves to incorporate a chevron style polytetrafluoroethylene(TEFLON) or Grafoil Packing. The packing acts as a seal/barrier between the external atmosphere, which is at relatively low pressure and warm and the higher pressure, cold temperature cryogenic process service. This is commonly called a "packed stem". Usually, this packed stem has a nut or other means to permit a user to tighten the packing during the normal service life of the valve. The packing acts as a seal between the process stream and the atmosphere, as well as for providing for relative movement of the valve hand wheel or actuator stem and thus is commonly referred to as a dynamic seal.

Several problems exist with the chevron style packing used with extended stem cryogenic valves. First, the polytetrafluoroethylene and graphite materials have less than desirable friction coefficients as they wear due to the dynamic stem rotation and linear actuation of the stem. Furthermore, in cold weather, the polytetrafluoroethylene (TEFLON) shrinks to a much greater degree than the surrounding materials. This relative shrinkage can produce leakage and frosting at this location. Typically this is resolved in the field by tightening down on the packing nut. Although tightening of the packing nut will temporarily resolve the leak the packing has now been over tightened. Over tightening of the packing causes the Teflon to cold flow and when the valve warms up again the packing will now tend to bind the valve stem and the binding can create premature wear thus greatly reducing the service life of the packing assembly. In conventional valves the hand wheel is fixed to the upper stem piece by an internal or external thread thus, rotation of the handwheel introduces axial movement for linear valve plug movement.

BRIEF SUMMARY OF THE INVENTION

It has been diskovered that an improved extended stem (shaft) globe valve suited for cryogenic service results from using a slip fit connection on either end of the shaft with the ends of the shaft configured to minimize heat transfer, together with the way in which the valve disk is assembled to a valve seal retainer on the end of the shaft juxtaposed to the valve seat.

Thus, in its broadest form the present invention pertains to a globe valve having an extended stem with a first end adapted to position a valve disk for opening and closing a valve seat to control flow of fluid through the valve, a second end of the valve stem is connected to an operator being one of a hand wheel or a pneumatic actuator to move the shaft by rotational forces applied by the hand wheel or pneumatic actuator, the improvement comprising; means on a first end of the shaft to couple a valve seal retainer to the shaft, the means permitting axially movement of the valve seal retainer while minimizing rotational movement of the valve seal retainer from rotational forces applied to the shaft; a valve disk coupled to the valve seal retainer, the valve disk adapted to, in a closed position prevent fluid flow through the valve; the second end of the shaft having means to couple the shaft to the operator, permitting axial movement of the shaft while minimizing rotational movement of the shaft from rotational forces applied to the shaft by the operator.

According to the invention the valve disk has a generally flat surface juxtaposed to the valve seat with a tapered peripheral edge adapted to engage a complimentary shaped portion of the valve seat. Furthermore, the invention includes a valve disk having a generally cylindrical shaped portion adapted to be inserted into a complimentary shaped opening in the valve seal retainer, the assembly rigidly connected by means of a spring pin, roll pin or dowel pin, the cylindrical portion and the pin positioned above the valve seat.

According to the invention the valve disk is preferably fabricated from a fluorocarbon material, e.g. KEL-F.

In yet another embodiment, the valve according to the present invention includes a stem insulator fixed to that portion of the valve supporting the actuator with the valve stem insulator extending for a substantial length around and along the stem from the supporting means toward the valve seal retainer.

The stem insulator is preferably fabricated from polytetrafluoroethylene (TEFLON).

In another embodiment of the invention the valve can include a bellows sealing assembly disposed between an upper end of the shaft and means to position the means to couple the second end of the shaft to the operator, the bellows sealing assembly positioned to prevent gas leakage around the second end of the shaft.

For certain applications, e.g. hydrogen service, the valve can include means to purge the area proximate the second end of the shaft and above the valve seat.

In yet another embodiment the valve can include an insulating or vacuum jacket assembly around the housing containing the shaft and the globe portion of the valve.

According to another embodiment of the invention the valve disk can include a projection extending below the valve seat the projection adapted to receive a disk cap having the general shape of a truncated cone with the cap acting as a linear flow control device. It is preferred that the disk cap is fixed to the projection by a spring pin, roll pin or dowel pin with the disk cap fabricated from brass and the spring pin fabricated from stainless steel.

In a preferred embodiment the valve includes a bonnet assembly having external threads to position the hand wheel actuator containing complementary internal threads, the hand wheel actuator adapted to move the shaft linearly as the hand wheel is rotated about an axis generally coincident with the longitudinal axis of the shaft.

According to the present invention the valve can optionally include means to purge detect the presence of unwanted gases in the bonnet assembly.

BRIEF DESCRIPTION OF THE SEVERAL VIEWS OF THE DRAWINGS

FIG. 1b, is an enlarged partial fragmentary plain view of the shaft of FIG. 1 and FIG. 1a.

DETAILED DESCRIPTION OF THE INVENTION

Figure 1:
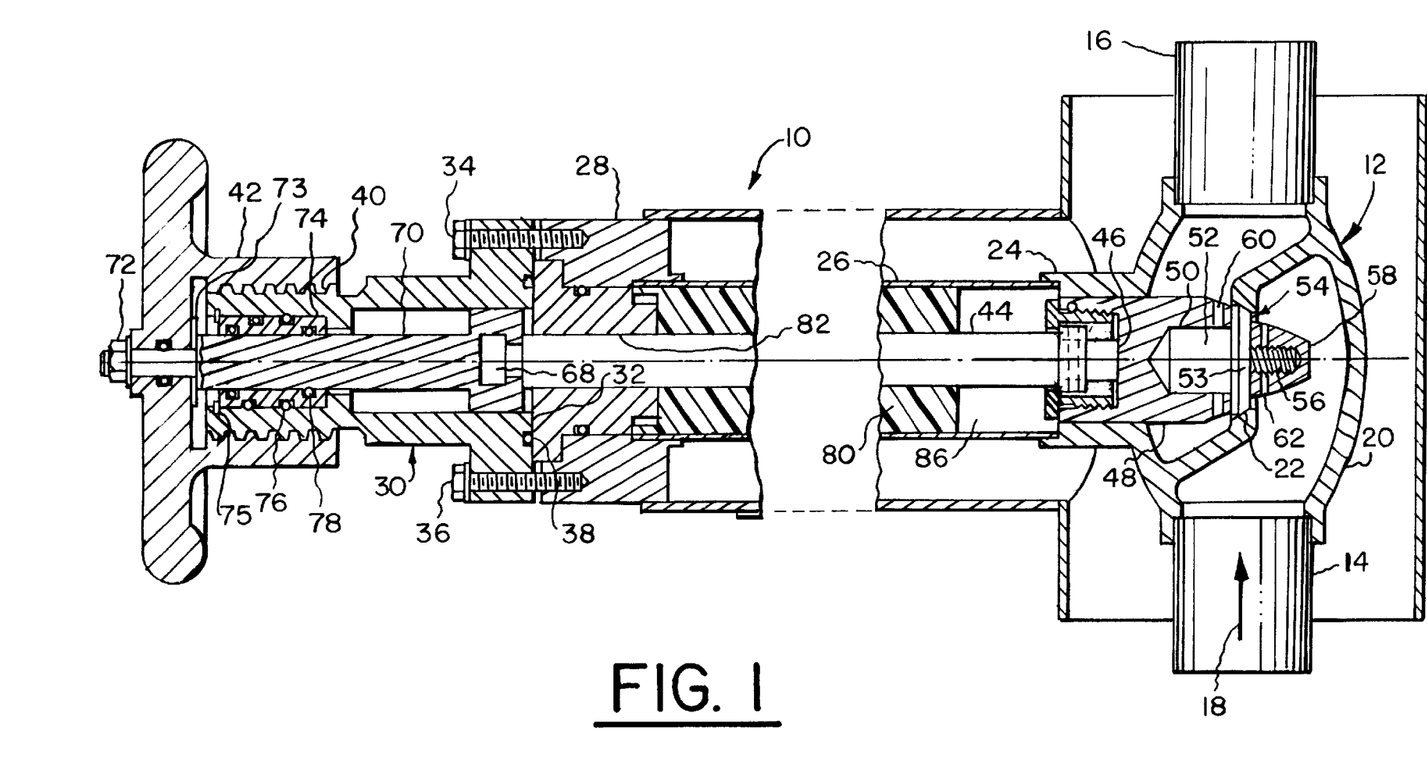
FIG. 1, is a partial fragmentary partial vertical cross section through a valve according to the present invention.

Referring to FIG. 1, the cryogenic valve according to the present invention is shown generally as 10. Valve 10 includes a lower assembly or globe portion 12 which includes inlet and outlet conduits 14, 16 respectively with the flow direction being shown by arrow 18. Fluid entering conduit 14 flows through the body 20 of lower assembly 12 past the valve seat 22 and outwardly through the exit conduit 16. The lower assembly includes an extended cylindrical portion 24, which receives a support tube 26 to which is connected to a flange 28. Flange 28 supports an upper or bonnet assembly 30, which includes a first or lip portion 32 which is sealingly engaged to the flange 28 by fasteners 34, 36 and a coil spring seal 38. Coil spring 38 is sold by Fluorocarbon Co. Ltd. of the United Kingdom, under the trade name Egiloy Spring Seal.

The bonnet assembly 30 includes an externally threaded portion 40, threads 40 mating with complimentary threads on the inner bore of hand wheel actuator 42. Hand wheel actuator 42 can be rotated clockwise or counter clockwise to permit the valve to be opened or closed, as will be hereinafter more fully explained.

Disposed within the support tube 26 is an elongated shaft 44. Shaft 44, is also referred to as a stem by workers skilled in the art. The first or lower end 46 of shaft 44 projects into an upper counter bore recess in a valve disk retainer 48. Valve disk retainer 48, is also referred to as a valve seal retainer, by workers skilled in the art. Valve disk retainer 48 includes a bottom tapered portion containing an internal counter bore 50 which is adapted to receive a stud portion 52 of the valve disk 54. The valve disk 54 contains a tapered annular disk portion 53 with a peripheral edge shaped to mate with the valve seat 22 of body 20. The valve disk 54 includes a bottom projection 56, which is adapted to be inserted into a mating counter bore or hole in a disk cap 58. Both bottom projection 56 and the mating hole in disk cap 58 can be threaded with male and female threads respectively to facilitate attaching the disk cap 58 to the valve disk 54. Workers skilled in the art often refer to the disk cap 58 as a bottom cap or bottom plug. The valve disk 54 is fixed to the valve disk retainer 48 by means of a pin 60, which may be a spring pin, a roll pin or a dowel pin. In a like matter the disk cap 58 is fixed to the downward projection 56 on the valve disk 54 by pin 62, which may be a spring pin, a roll pin or a dowel pin. An interference or tight fit, which will prevent critical parts from separating during the life of the valve 10, can be achieved by fabricating the pins 60, 62 from a material such as stainless steel, fabricating the valve disk 54 from a material such as KEL-F, and fabricating the bottom disk cap 58 from brass. Since the KEL-F and brass will shrink to a much greater degree at cryogenic temperatures than the stainless steel pin and valve disk retainer, this results in a strong force exerted on the pins, thus assuring the interference (tight) fit.

Figure 1A:
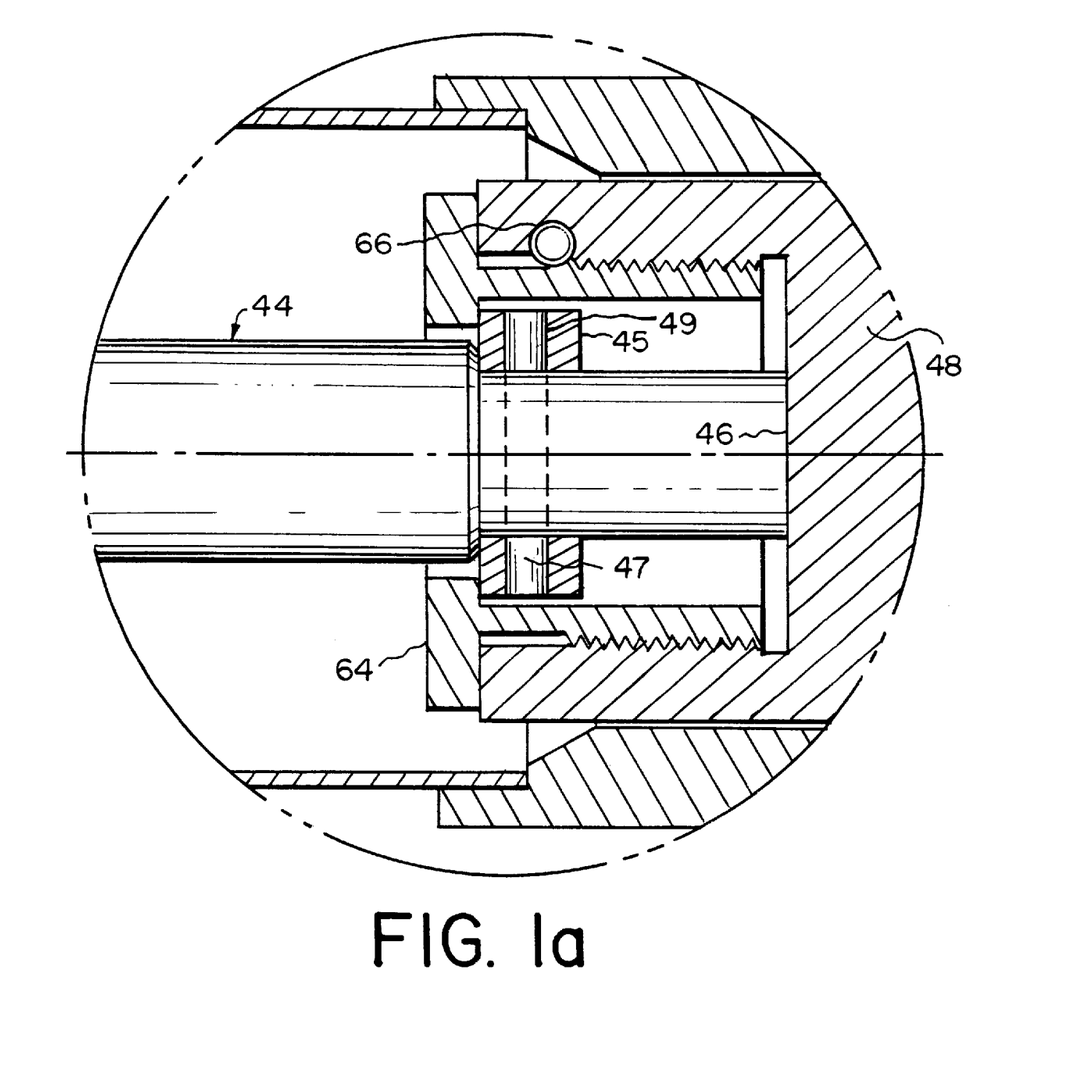
FIG. 1a, is an enlarged fragmentary view, partially in section, of the lower end of the shaft of the valve according to the present invention.
Figure 1B:
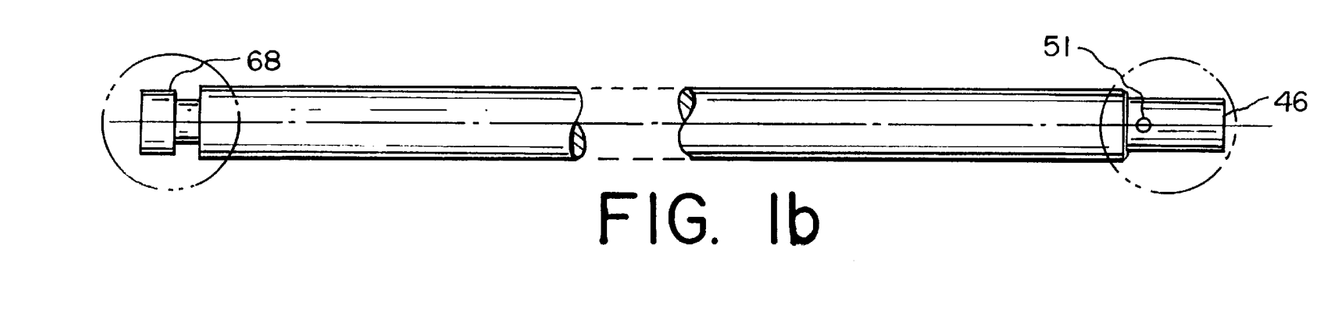
Figure 1C:
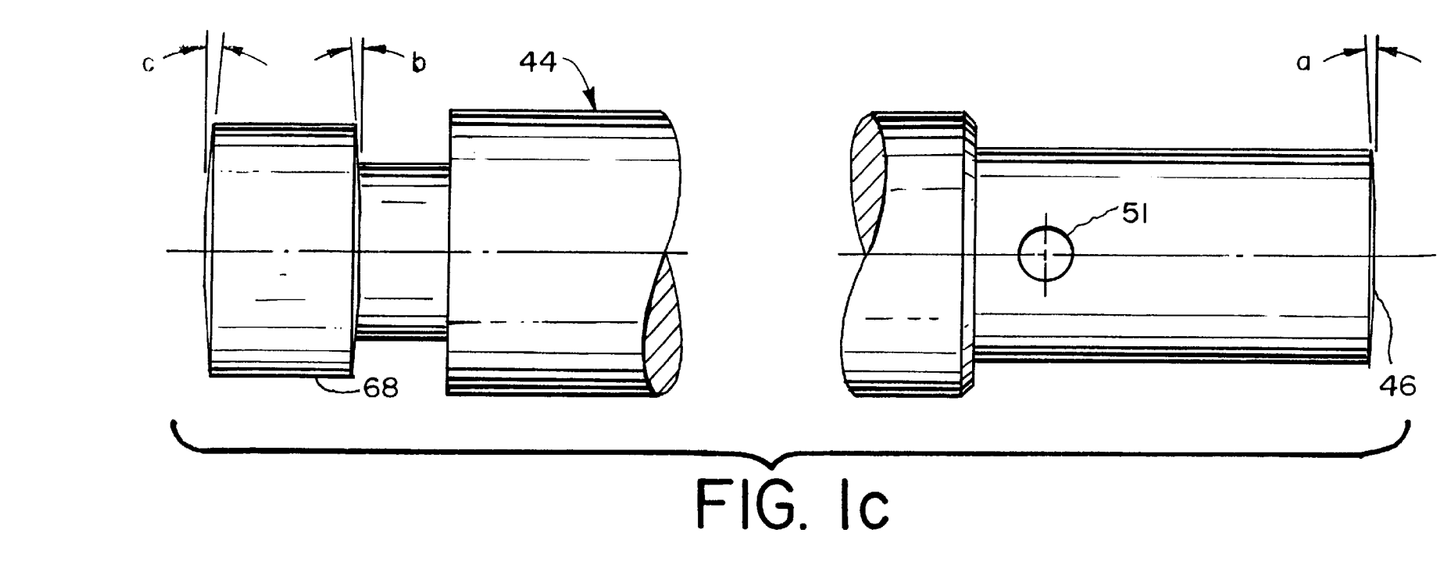
FIG. 1c, is a further enlarged partial fragmentary plain view of the shaft of FIG. 1, FIG. 1a and FIG. 1b illustrating a feature of the present invention.

As shown in FIG. 1a valve disk retainer 48 can be coupled to the lower, or first end of shaft 44 by means of a stem washer 45, plug nut 64 and pin 66. As shown in FIG. 1a, FIG. 1b and FIG. 1c, the first end 46 of shaft 44 includes a stepped down portion adapted to receive a stem washer 45. Stem washer 45 bears against an inner surface of plug nut 64 and is fixed to shaft 44 by means of a spring pin 47. Spring pin 47 extends through a transverse aperture 49 in the stem washer 45, which is aligned with a transverse aperture 51 in the shaft 44 as illustrated in the drawings. Plug nut 64 is slipped over the shaft 44 and rests on stem washer 45. When plug nut 64 is threaded into a threaded aperture in valve disk retainer 48 and a spring pin 66 is driven into a suitably placed aperture the valve disk retainer 48 is coupled to shaft 44.

Figure 1D:
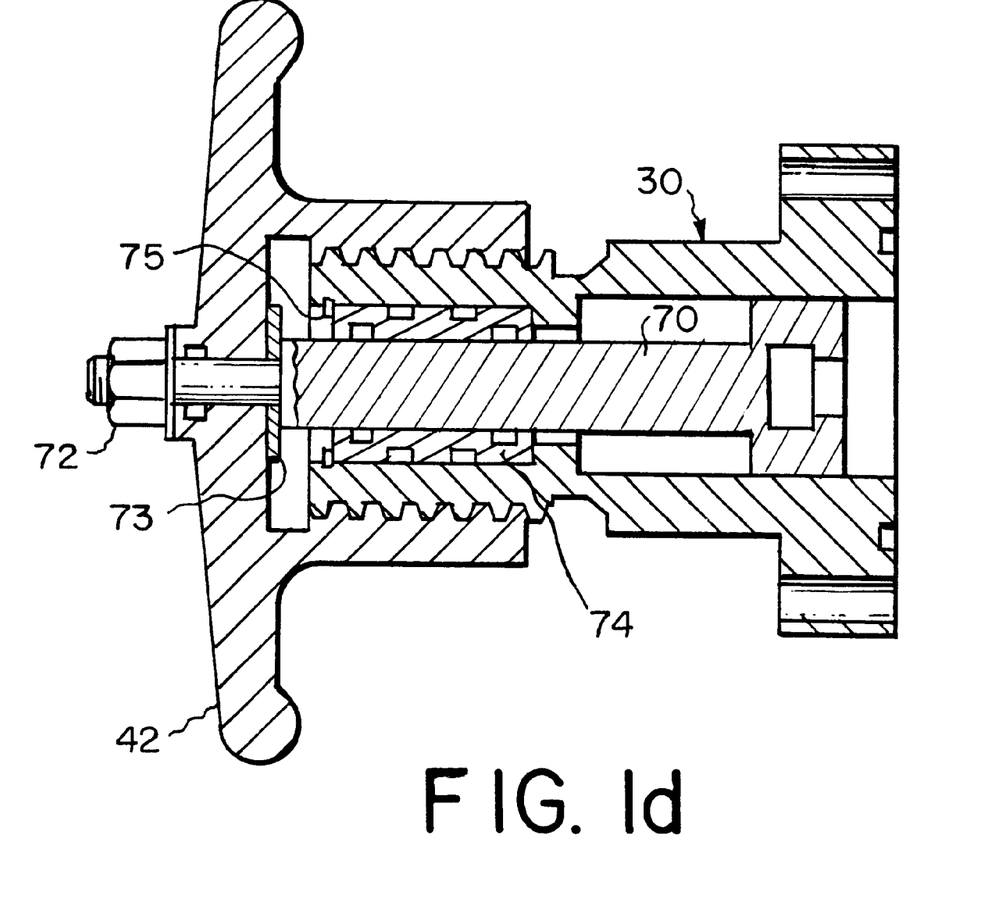
FIG. 1d, is an enlarged cross-sectional view of the bonnet assembly with shaft extender and hand wheel actuator of a valve according to the present invention.

The upper (second) end, shaft 44 contains a slip fitting assembly 68 which fits into a shaft extender 70. The shaft extender 70 is sealed to the upper housing or bonnet assembly 30 by means of an upper valve stem packing 74 which contains internal and external recesses which in turn contain sealing devices such as O-rings 76, 78. As shown in FIG. 1d, the upper valve stem packing 74 is fixed to bonnet assembly 30 by means of a snap ring 75. Snap ring 75 has a large central aperture that permits shaft extender to move upwardly or downwardly as the hand wheel 42 is rotated. The upper end of shaft extender 70 fits through an oversized central hole in the hand wheel 42. A threaded portion on the extreme upper end of the shaft extension 70 and a suitable nut 72 in cooperation with a washer 73 couples the shaft extension 70 to the hand wheel. The diameter of the portion of shaft extender 70 extending in and through the central hole in hand wheel 42 is less than the diameter of the central hole in the hand wheel 42. Thus as the hand wheel 42 is rotated to open or close the valve, very little rotary motion is imparted to the shaft extension 70, shaft 44 and valve disk retainer 48 while imparting linear motion to these components of the valve 10.

Disposed inside of the support tube 26 is an insulator 80, which extends from the upper flange 28 insert 82 toward the first end of the shaft 46. The insulator fits over the shaft 44 and is fixed to the assembly 82 with threads so that it will not slip down or be out of position thus, defining a void space only near the bottom of the support tube 26. Preferably the insulator is made from a material such as Teflon.

FIG. 1b and FIG. 1c show unique features of shaft 44. As shown in FIG. 1c the first end 46 and the bottom and top surfaces of slip fitting assembly 68 are tapered at angles shown as a, b, and c respectively. A preferred taper for each of a, b, and c is 3°. The tapered surfaces are the three contact surfaces of the shaft 44. Since there is true axial loading of the valve when it is in service, the tapered surfaces provides for reduced heat leak paths due to conduction into the shaft 44 since each tapered or rounded surface facilitates contact along a fraction of the respective mating surfaces. The tapered or rounded contact surfaces of shaft 44 provide for reduced torque transmission from the shaft extender 70 to the shaft 44 and from the shaft 44 to the valve disk retainer 48 because of the minimized surface contact. Torque transmission is reduced since the resulting friction between components acts at a shorter distance from the centerline of the shaft 44.

Figure 2:
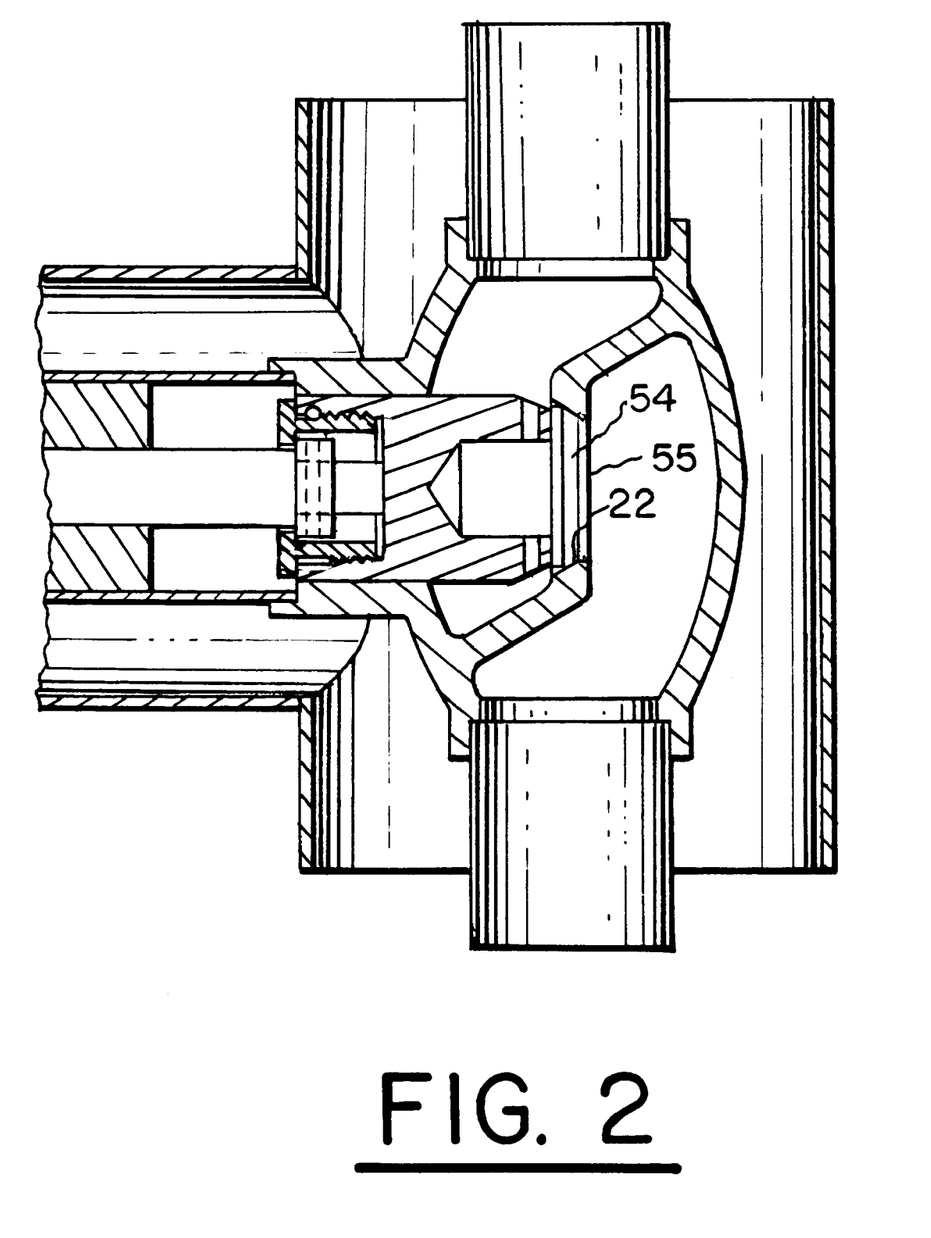
FIG. 2, is a fragmentary longitudinal section illustrating an alternate embodiment of the valve seat portion of the present invention.

FIG. 2, illustrates a quick opening version of the valve according to the present invention wherein the valve disk 54 terminates in a flat surface 55 and does not include the lower projection and the disk cap shown in FIG. 1. Thus, as soon as the valve seal or disk 54 is withdrawn from the seat 22 flow is initiated through the valve.

Figure 3:
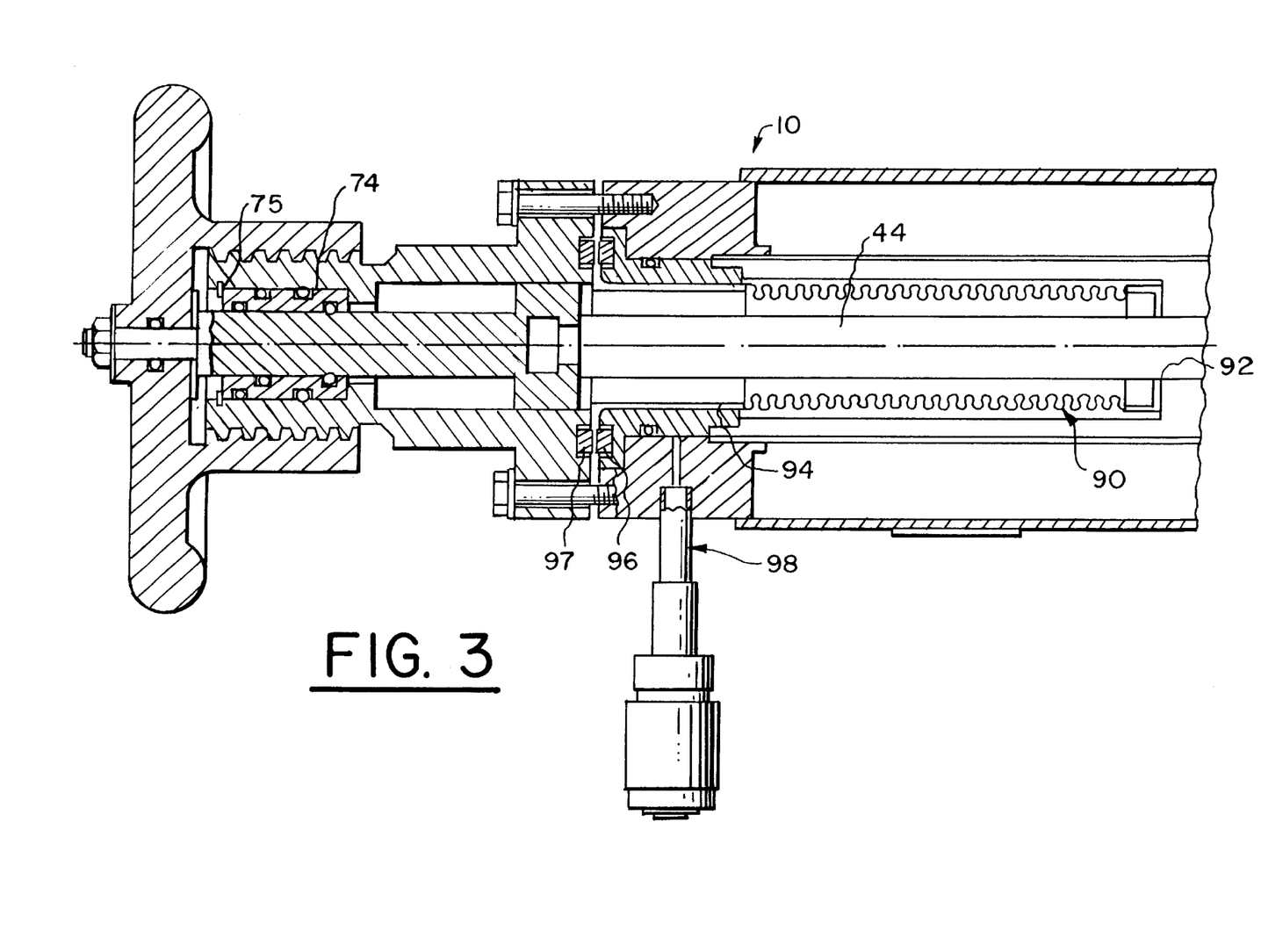
FIG. 3, is a fragmentary longitudinal section illustrating an alternate embodiment of the invention.

FIG. 3, illustrates an embodiment of the valve 10 wherein a bellows assembly 90 is disposed around the upper portion of the shaft 44 being sealed there to by fillet welds at location 92. The bellows assembly 90 is fixed at its upper end to a collar 94 which in turn is sealingly engaged to the bonnet assembly by means of fluid tight gaskets 96, 97. Communicating with the portion of the valve defined at the upper end of the shaft is a "bottom purge system" or port assembly 98 so that prior to using a valve with a bellows assembly 90 in service, warm gas can be introduced to purge out above the valve seat. This is a valve that is particularly suited for service in dispensing and or transferring liquid or gaseous hydrogen.

Figure 4:
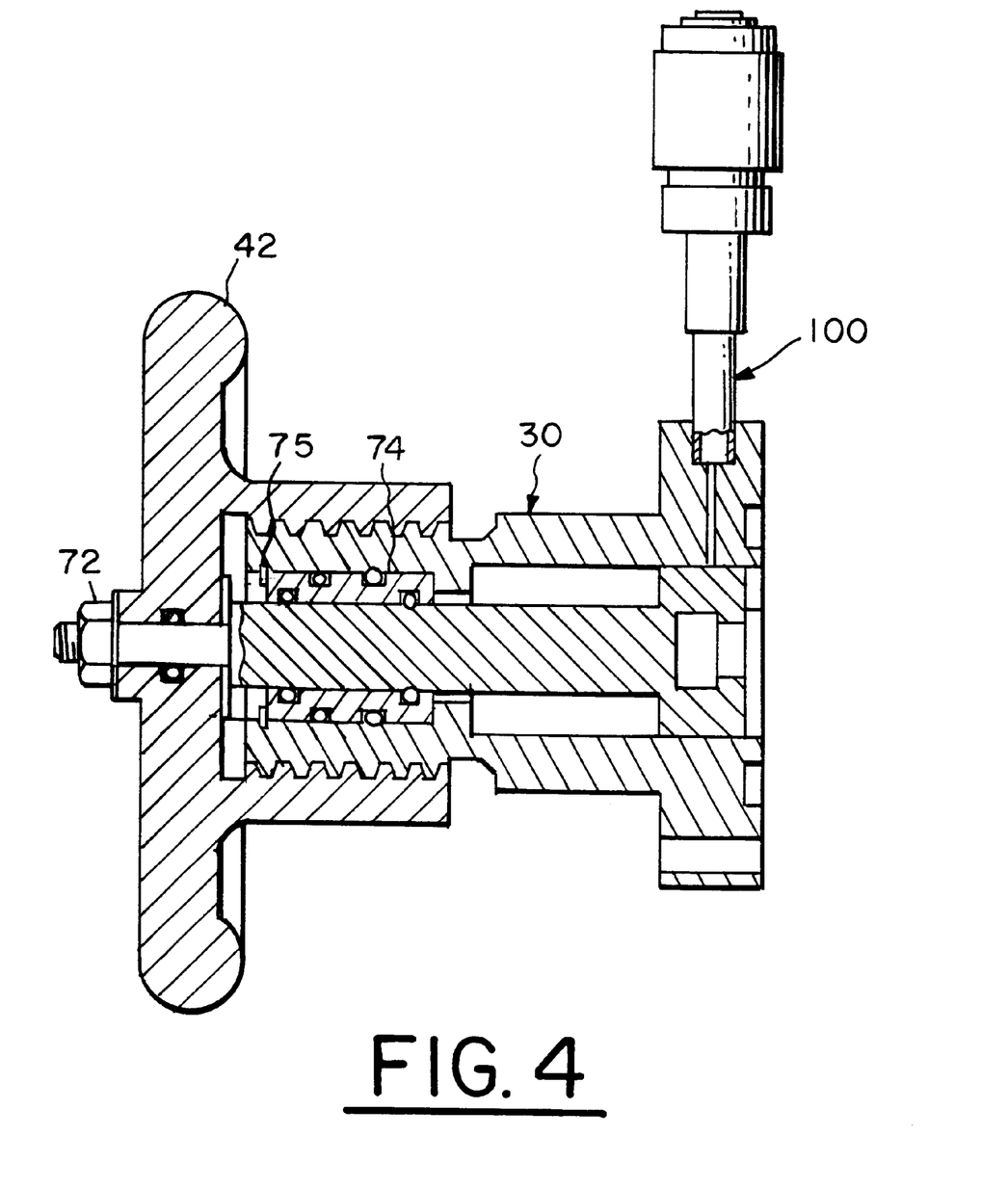
FIG. 4, is a longitudinal section illustrating the top purge feature for a valve according to the present invention.

FIG. 4, illustrates a "top purge system" 100 which can be incorporated into the bonnet assembly 30 of a valve incorporating a bellows assembly to detect failure of the bellows by use of a pressure indicator or hydrocarbon detector coupled to the purge system 100.

Figure 5:
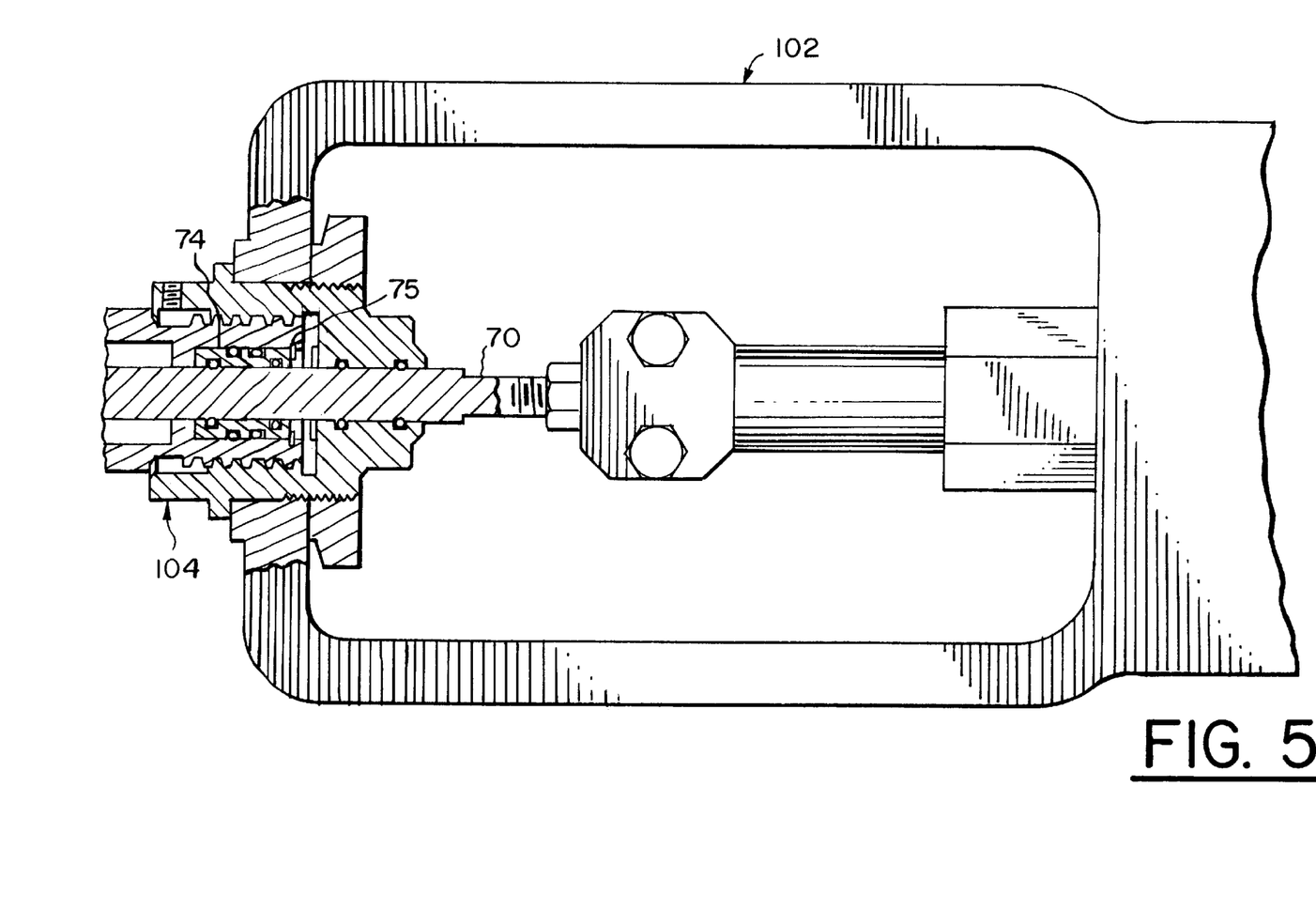
FIG. 5, is a vertical view of partially in section illustrating a pneumatic actuator with the valve of the present invention.

FIG. 5, illustrates an actuator system 102 which is coupled to the shaft extender 70 which projects through the bonnet assembly 104. Such pneumatic actuators are well known to users of cryogenic valves by connecting the upper end of the valve stem assembly 70 to the actuator system 102 for remote actuation or automatic actuation by operators (not shown) that are well known in the art.

From the foregoing description it can be seen that several features of the valve according to the present invention provide for benefits heretofore unknown in extended stem cryogenic valves. The valve disk retainer is designed with an extension above that part of the valve disk that actually seats against the valve seat. The valve disk is attached to the valve disk retainer which is conventionally made of stainless steel, by being inserted into a receiving aperture in the valve retainer, with the assembly held in place with a stainless steel spring pin, roll pin or dowel pin. Attachment of the valve disk to the valve disk retainer occurs above the seat, i.e. on the downstream side of the valve. The valve disk is a solid piece of material with no through holes that can be exposed to both sides of the valve seat. Thus, it is impossible to develop a leak across the assembly with the design of the present invention, which eliminates the multiple leak path problems inherent in prior art devices. The spring pin attachment is more effective in holding the components together since the KEL-F shrinks at a much greater rate than the stainless steel in cryogenic service. Therefore any concerns that the pin can come out are erased since over and above the frictional force the pin has been designed to generate to hold the assembly together, the KEL-F will be a shrink fit onto the pin while it is in service.

In the flow control embodiment (FIG. 1) of the valve according to the present invention the KEL-F valve seal material is now extended as single piece by adding a length of male thread that extends down below the seat. This lower projection or stud is then used to attach the flow control plug. The flow control plug, which can have various shapes, is a solid brass material and is attached to the stud on the valve seal with a female thread. The assembly also incorporates a spring pin to prevent the plug from backing off the KEL-F stud. The same mechanisms for extra spring pin engagement resilience are incorporated into this embodiment since both the brass plug and the KEL-F stud shrink to a much greater degree than a stainless steel spring pin. An additional benefit results from the fact that the control plug is fabricated from a single piece of brass. Since brass is very compatible for oxygen service where immediately as the valve is shut-off and flow is stopped, adiabatic compression occurs when a sudden surge of liquid and gas is introduced and compressed at the point of flow stoppage. The sudden compression generates heat and in some instances this can become a source of ignition. Since the plug is made of brass, a large piece of highly conductive metal, it will act as a heat sink, this in turn will minimize surface temperature elevation of the plug in an adiabatic compression situation, thus automatically incorporating a safety feature into the valve. This is particularly desirable for valves used in oxygen service.

In view of the fact that the present design incorporates rounding or tapering of the lower end and slip fit contact surfaces of the shaft 44 by adding a taper, e.g. about 3°, there is true axial loading of the valve while it is in service. In addition this design provides for a reduction heat leak due to conduction across the stem due to point contact instead of flush contact between the shaft and the valve seal retainer.

The present valve has been designed to all but eliminate the amount of available space in the area below the top works of the valve. The Teflon insulator fills the extended stem void and is attached to the bottom "top works". This design eliminates the free volume at the top of the valve and relocates it down at the location of the valve seal retainer assembly closest to the process stream where it is required and is needed for valve stroke. Prototypes of the valve were tested by having the downstream end installed close to a pump. This testing proved the value of the location of the Teflon insulator.

In the bellows seal design, the Teflon stem insulator is counter bored to accept the bellows assembly. In this design the insulator acts as a bellows squirm inhibitor when the valve is in the full open position and the bellows is compressed. It is well known that bellows are designed for axial compression and extension but are not designed for lateral deflection. Without means for guiding the bellows they can laterally deflect as they are being compressed. Lateral deflection can result in premature failure of the bellows assembly. Thus the present invention utilizes the counter bored stem insulator as the means for external guiding.

The standard for extended stem cryogenic valves has been and still is to incorporate a chevron style Teflon or Grafoil packing.

The present invention incorporates a brass bushing (upper stem sleeve or valve packing 74) with several O-rings instead of a chevron packing. The bushing design combined with the external thread design and the hand wheel method of attachment provides for several significant improvements over existing extended stem valves which are currently on the market. Due to the hand wheel design the present invention does not need to incorporate an internal thread. Also the present invention results in a valve that does not require that the hand wheel to be rigidly fixed to the upper stem. This allows for the method of attachment of the hand wheel to address axial movement only, relative to the upper stem. Thus, the present invention permits free rotation of the hand wheel resulting in the desired axial movement of the extended valve stem and valve plug or valve seal support without having to rotate the upper stem itself. This is very desirable since it eliminates the radial wear component of the packing. Thus, the O-ring packing of the present invention only sees frictional forces due to pure axial loading. This structure along with the incorporation of the resiliency of O-rings as opposed to Teflon or Grafoil style packing in dynamic sealing applications is a dramatic improvement in sealing for an extended stem cryogenic valve. It is anticipated this design will produce a much greater service life as well as lower the probability of leakage commonly associated with prior art extended stem valves.

Having thus described my invention as illustrated and described herein with reference to certain specific embodiments, the present invention is nevertheless not intended to be limited to the details shown. Further, various modifications may be made in the details within the scope of the invention desired to be secured by letters patent of the United States as set forth in the appended claims.

What is claimed:

1. In a globe valve having an extended shaft with a first end adapted to position a valve disk for opening and closing a valve seat to control flow of fluid through said valve, a second end of said shaft connected to an operator to move said shaft by rotation of said shaft, the improvement comprising:

means on said first end of said shaft to couple a valve disk retainer to said shaft to reduce heat conduction into said shaft, said means permitting axial movement of said valve disk retainer by rotational movement of said valve disk retainer from rotational forces applied to said shaft;

a valve disk coupled to said valve disk retainer, said valve disk adapted to, in a closed position, prevent fluid flow through said valve; and, said second end of said shaft having means to couple said shaft to said operator, to reduce heat conduction into said shaft said means permitting axial movement of said shaft by rotational movement of said shaft from rotational forces applied to said shaft by said operator.

2. A valve according to claim 1 wherein said valve disk has a generally flat surface juxtaposed to said valve seat with a tapered peripheral edge adapted to engage a complementary shaped valve seat.

3. A valve according to claim 1 wherein said valve disk has a generally cylindrically shaped portion adapted to be inserted into a complimentary shaped opening in said valve disk retainer, with said valve disk and said valve disk retainer rigidly connected by pin means, said cylindrical portion and said pin means positioned above said valve seat.

4. A valve according to claim 1 wherein the valve disk is fabricated from a fluorocarbon plastic material.

5. A valve according to claim 4 wherein the material is KEL-F.

6. A valve according to claim 1 including an insulator fixed to means supporting said operator, said insulator extending for a substantial length around and along said shaft from said supporting means toward said valve disk retainer.

7. A valve according to claim 6 wherein the stem insulator is fabricated from polytetrafluoroethylene.

8. A valve according to claim 1 including a bellows sealing assembly between said shaft and means to position said means to couple said second end of said shaft to said operator, said bellows sealing assembly positioned to prevent gas leakage around said second end of said shaft.

9. A valve according to claim 1 including means to purge said valve in an area proximate said second end of said shaft.

10. A valve according to claim 1 further including an insulating jacket assembly around a housing containing said shaft and a globe portion of said valve.

11. A valve according to claim 1 wherein said valve disk includes a projection extending below said valve seat said projection adapted to receive a disk cap being the general shape of a truncated cone, said cap acting as a linear flow control device.

12. A valve according to claim 11 wherein said disk cap is fixed to said projection by a spring pin.

13. A valve according to claim 12 wherein said spring pin is stainless steel.

14. A valve according to claim 12 wherein said disk cap is fabricated from brass and said spring pin is fabricated from stainless steel.

15. A valve according to claim 1 including a bonnet assembly having external threads to position a hand wheel actuator containing complimentary internal threads, said hand wheel actuator adapted to move said shaft linearly as said hand wheel is rotated about an axis generally coincident with a longitudinal axis of said shaft.

16. A valve according to claim 8 including means to permit purging of said valve above said valve seat.

17. A valve according to claim 15 including a valve stem packing consisting of a generally cylindrical body with internal circumferential grooves to receive O-ring seals to contact said shaft and having external grooves to receive O-ring seals to contact an inner surface of said bonnet assembly.

18. A valve according to claim 17 wherein said body has at least two inner grooves and at least four outer grooves to receive said O-ring seals.

* * * * *